United States Patent
Ito et al.

(10) Patent No.: US 11,090,767 B2
(45) Date of Patent: Aug. 17, 2021

(54) CURVED PLATE MACHINING APPARATUS, AND METHOD OF MANUFACTURING CURVED PLATE WITH MACHINED OUTER CIRCUMFERENCE

(71) Applicant: AGC Inc., Chiyoda-ku (JP)

(72) Inventors: Masabumi Ito, Tokyo (JP); Itsuro Watanabe, Tokyo (JP); Hiroyuki Ezura, Tokyo (JP); Masahiro Deguchi, Tokyo (JP); Keisuke Kato, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 139 days.

(21) Appl. No.: 16/414,320

(22) Filed: May 16, 2019

(65) Prior Publication Data

US 2019/0270166 A1    Sep. 5, 2019

Related U.S. Application Data

(63) Continuation of application No. PCT/JP2017/038202, filed on Oct. 23, 2017.

(30) Foreign Application Priority Data

Nov. 18, 2016  (JP) .............................. JP2016-225466

(51) Int. Cl.
*B23K 26/364* (2014.01)
*C03C 19/00* (2006.01)
(Continued)

(52) U.S. Cl.
CPC ............ *B23K 26/364* (2015.10); *B23Q 35/10* (2013.01); *B24B 9/10* (2013.01); *B24B 17/02* (2013.01);
(Continued)

(58) Field of Classification Search
CPC ........ B23K 26/364; C03C 19/00; B28D 5/00; C03B 33/027; C03B 33/09; B24B 9/10;
(Continued)

(56) References Cited

U.S. PATENT DOCUMENTS

2011/0261429 A1*  10/2011  Sbar ..................... G02F 1/153
                                                 359/265
2013/0202378 A1   8/2013  Yamane et al.
(Continued)

FOREIGN PATENT DOCUMENTS

CN         2404648 Y      11/2000
CN       103144003 A       6/2013
(Continued)

OTHER PUBLICATIONS

International Search Report dated Jan. 16, 2018 in PCT/JP2017/038202 filed Oct. 23, 2017 (with English Translation).
(Continued)

*Primary Examiner* — John P. Dulka
(74) *Attorney, Agent, or Firm* — Oblon, McClelland, Maier & Neustadt, L.L.P.

(57) ABSTRACT

A machining apparatus for a curved plate includes a holder that holds a main surface of a curved plate having curved surfaces on both main surfaces; a machining device that machines an outer circumference of the curved plate held by the holder; a movable frame that retains the machining device; a driver that moves the movable frame to move a machining point of the curved plate held by the holder; a controller that controls the driver; and a guide that guides the movable frame along the outer circumference of the curved plate held by the holder.

29 Claims, 7 Drawing Sheets

(51) Int. Cl.
*B28D 5/00* (2006.01)
*C03B 33/027* (2006.01)
*C03B 33/09* (2006.01)
*B24B 9/10* (2006.01)
*B23Q 35/10* (2006.01)
*B25J 13/00* (2006.01)
*B24B 17/02* (2006.01)
*B24B 27/00* (2006.01)
*B23K 103/00* (2006.01)

(52) U.S. Cl.
CPC .............. *B24B 27/00* (2013.01); *B25J 13/00* (2013.01); *B28D 5/00* (2013.01); *C03B 33/027* (2013.01); *C03B 33/09* (2013.01); *C03C 19/00* (2013.01); *B23K 2103/54* (2018.08)

(58) Field of Classification Search
CPC ....... B24B 9/02; B24B 41/061; B24B 41/068; B24B 9/08; B24B 27/0038; B24B 27/003; B24B 17/02; B23Q 35/10; B25J 13/00; B25J 11/0065
See application file for complete search history.

(56) References Cited

U.S. PATENT DOCUMENTS

| | | | | |
|---|---|---|---|---|
| 2013/0288010 | A1* | 10/2013 | Akarapu | B24B 9/10 428/157 |
| 2014/0065376 | A1* | 3/2014 | Venkatachalam | B24B 47/225 428/192 |
| 2016/0250736 | A1* | 9/2016 | Zhou | B23Q 3/00 451/5 |
| 2018/0021911 | A1* | 1/2018 | Miyamoto | B24B 41/061 451/11 |
| 2019/0210177 | A1* | 7/2019 | Graves | B25J 9/02 |
| 2020/0377405 | A1* | 12/2020 | Gotz | B24B 7/242 |
| 2020/0406421 | A1* | 12/2020 | Chen | B24B 41/068 |

FOREIGN PATENT DOCUMENTS

| | | | | |
|---|---|---|---|---|
| EP | 3542953 A1 * | 9/2019 | | B24B 17/02 |
| JP | 45-19879 | 7/1970 | | |
| JP | 46-11983 | 4/1971 | | |
| JP | 58-80153 U | 5/1983 | | |
| JP | 8-40739 | 2/1996 | | |
| JP | 2002-370116 A | 12/2002 | | |
| JP | 2004-330353 A | 11/2004 | | |
| JP | 2005-119152 | 5/2005 | | |
| JP | 2005119152 A * | 5/2005 | | |
| JP | 2012-139802 | 7/2012 | | |
| JP | 2012139802 A * | 7/2012 | | B23Q 35/105 |
| JP | 2014-40001 A | 3/2014 | | |
| JP | 2015-38023 | 2/2015 | | |
| JP | 2015038023 A * | 2/2015 | | |

OTHER PUBLICATIONS

Written Opinion dated Jan. 16, 2018 in PCT/JP2017/038202 filed Oct. 23, 2017.

* cited by examiner

CURVED PLATE MACHINING APPARATUS, AND METHOD OF MANUFACTURING CURVED PLATE WITH MACHINED OUTER CIRCUMFERENCE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/038202 filed on Oct. 23, 2017 and designating the U.S., which claims priority of Japanese Patent Application No. 2016-225466 filed on Nov. 18, 2016. The entire contents of the foregoing applications are incorporated herein by reference.

BACKGROUND OF THE INVENTION

1. Field of the Invention

The disclosure herein generally relates to a curved plate machining apparatus and a method of manufacturing a curved plate with a machined outer circumference.

2. Description of the Related Art

In a glass cutting apparatus disclosed in Japanese Unexamined Patent Application Publication No. 8-40739, a plane-shaped template dedicated for a glass piece having a plane shape to be cut is combined with a cutting device. The template is fixed to a glass plate by a fixing device, and the cutting device is moved along the template. Thus, a glass piece having a desired shape can be obtained.

SUMMARY OF THE INVENTION

Technical Problem

Conventionally, although machining accuracies for planar plates have been studied, machining accuracies for curved plates have not been studied. Curved plates referred here are plates having curved surfaces.

The present invention was made in view of such a problem, and it is a main object to provide a machining apparatus for a curved plate with a high precision of machining.

Means for Solving Problems

In order to solve the above-described problems, according to an aspect of the present invention, a machining apparatus for a curved plate including a holder that holds a main surface of a curved plate having curved surfaces; a machining device that machines an outer circumference of the curved plate held by the holder; a movable frame that retains the machining device; a driver that moves the movable frame to move a machining point of the curved plate held by the holder; a controller that controls the driver; and a guide that guides the movable frame along the outer circumference of the curved plate held by the holder, is provided.

In order to solve the above-described problems, according to another aspect of the present invention, a machining apparatus for a curved plate including a holder that holds a main surface of a curved plate having curved surfaces on both main surfaces; a machining device that machines an outer circumference of the curved plate held by the holder; a movable frame that retains the machining device; a driver that moves the movable frame to move a machining point of the curved plate held by the holder; and a controller that controls the driver, the holder including a guide that guides the movable frame along the outer circumference of the curved plate held by the holder, is provided.

Moreover, in order to solve the above-described problems, according to yet another aspect of the present invention, a manufacturing method of a curved plate with a machined outer circumference including holding a main surface of a curved plate having curved surfaces by a holder; machining an outer circumference of the curved plate, held by the holder, by a machining device; and guiding, when a movable frame that retains the machining device is moved in the machining, the movable frame along the outer circumference of the curved plate held by the holder, by using a guide, is provided.

In order to solve the above-described problems, according to still another aspect of the present invention, a manufacturing method of a curved plate with a machined outer circumference including holding a main surface of a curved plate having curved surfaces by a holder; machining an outer circumference of the curved plate, held by the holder, by a machining device; and guiding, when a movable frame that retains the machining device is moved in the machining, the movable frame along the outer circumference of the curved plate held by the holder, by using a guide included in the holder, is provided.

Advantageous Effect of Invention

According to an aspect of the present invention, a machining apparatus for a curved plate and a manufacturing method of a curved plate with a high precision of machining, is provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, with respect to drawings, embodiments of the present invention will be described. In each drawing, the same or corresponding reference numeral is assigned to the same or corresponding component, and redundant explanation will be omitted.

(Machining Apparatus)

Figure 1:
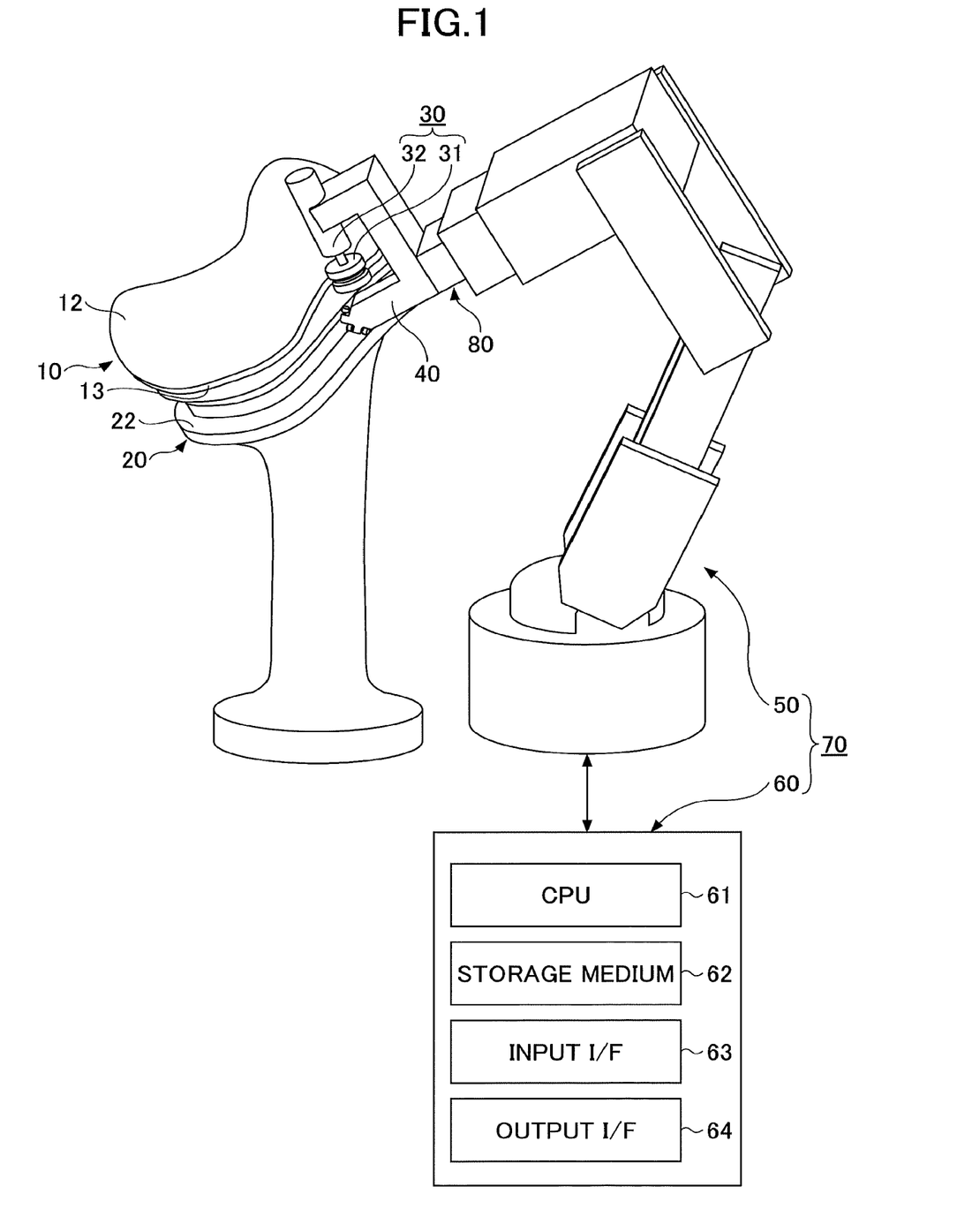
FIG. 1 is a diagram depicting an example of a machining apparatus according to an embodiment.
Figure 2:
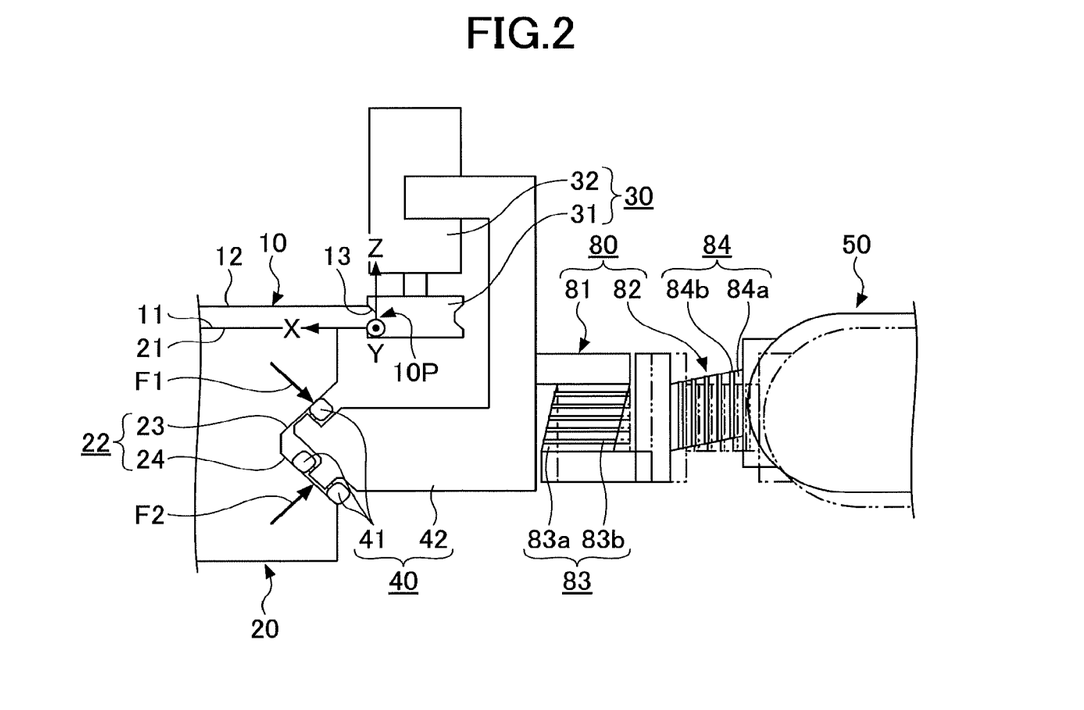
FIG. 2 is a diagram depicting an example of a main part of the machining apparatus according to the embodiment.

FIG. 1 is a diagram depicting a machining apparatus according to an embodiment. FIG. 2 is a diagram depicting a main part of the machining apparatus according to the embodiment. In FIG. 2, an X-axis, a Y-axis, and a Z-axis are orthogonal coordinate axes fixed to a movable frame 40, and move or rotate with the movable frame 40. The Y-axis is parallel to a moving direction of the movable frame 40. The Z-axis is parallel to a plate thickness direction of a curved plate 10, at a machining point 10P (see FIG. 2, etc.).

The machining apparatus machines an outer circumference of the curved plate 10. Here, the curved plate 10 is a plate having curved surfaces 11 and 12 (see FIG. 2, etc.). The entire main surfaces 11, 12 may be curved. Alternatively, a part of the main surfaces 11 and 12 may be curved and the rest may be planar. Because the curved plate 10 is formed of a curved surface, the Z-axis is not always perpendicular to the horizontal plane. Then, the angle between the Z-axis and the horizontal plane may vary depending on the position of the machining point 10P. The curved plate 10 is, for example, a glass plate. Note that the curved plate 10 is not limited to a glass plate, and may be a metal plate, a resin plate, a ceramic plate, a semiconductor plate, or the like. The outer circumference includes a region of 20 cm from an outer periphery 13, before machining the curved plate 10, toward a center of the main surface 11 or 12.

The machining apparatus includes a holder 20 that holds the main surface 11 of the curved plate 10, a machining device 30 that machines an outer circumference of the curved plate 10 held by the holder 20, a movable frame 40 that retains the machining device 30, a driver 50 that moves the movable frame 40, and a controller 60 that controls the driver 50.

The holder 20 holds the main surface 11 of the curved plate 10. A holding surface 21 (see FIG. 2, etc.) also has a curved surface.

The holder 20 may have a resin layer or rubber layer on the holding surface 21. The resin layer or rubber layer may be used, for example, being bonded to a base. A holding base that holds the curved plate 10 is configured of the resin layer or rubber layer; and the base.

The resin layer or rubber layer can absorb mismatch in shape between the holding surface 21 and the main surface 11 by an elastic deformation. Moreover, the resin layer or rubber layer can reduce damage to the curved plate 10 by the elastic deformation.

The holder 20 applies suction to the main surface 11 of the curved plate 10, for example. A suction hole is formed on the holding surface 21 of the holder 20, and the suction hole is connected to a vacuum pump. When the curved plate 10 is placed on the holding surface 21 of the holder 20 and the vacuum pump operates, the holder 20 applies suction to the curved plate 10.

The method of holding the curved plate 10 by the holder 20 is not limited to the suction. For example, the holder 20 may have a sucker layer on the holding surface 21. The sucker layer has a plurality of micropores, and each micropore functions as a sucker. The sucker layer holds the curved plate 10 by an adsorption force of the suckers.

The machining device 30 machines the outer circumference of the curved plate 10 held by the holder 20. For example, the machining device 30 includes a grinding device 31 that grinds the outer periphery 13 of the curved plate 10 held by the holder 20. In this case, the holder 20 holds a part of the curved plate 10, which is separated (inwardly) from the outer periphery 13, so as not to interfere with the grinding device 31.

The grinding device 31 is, for example, a rotating grinding wheel which grinds the end face 13 of the curved plate 10 held by the holder 20. A rotational axis of the rotating grinding wheel is parallel to the Z-axis. A rotating grinding wheel may be a chamfering grinding wheel with a grinding groove having a U-shaped cross-section. The rotating grinding wheel may be a general-purpose grinding wheel without grinding grooves.

The machining device with the rotating grinding wheel 30 further includes a rotation driver 32 that rotates the grinding wheel. An electric motor or the like is used as the rotation driver 32. The rotation driver 32 is fixed to the movable frame 40.

The movable frame 40 retains the machining device 30. For example, the movable frame 40 retains the grinding device 31 so that the grinding device can rotate freely.

The driver 50 moves the movable frame 40 under the control of the controller 60 so that the machining point 10P, to be machined by the machining device 30, of the curved plate 10 held by the holder 20 (hereinafter simply referred to as a "machining point 10P of the curved plate 10") is moved. The machining point 10P of the curved plate 10 is moved along the outer circumference of the curved plate 10. "Moved along the outer circumference" means moving the machining point 10P along a line of machining the outer circumference.

The controller 60 includes a CPU (Central Processing Unit) 61, a storage medium 62 such as a memory, an input interface 63, and an output interface 64. The controller 60 performs various controls by causing the CPU 61 to execute programs stored in the storage medium 62. Moreover, the controller 60 receives signals at the input interface 63 from outside, and transmits signals to the outside at the output interface 64.

An industrial robot 70 may be configured of the driver 50 and the controller 60. The industrial robot 70 is an apparatus used in an industry having an automatically controlled manipulation function or a moving function. The industrial robot can perform various tasks according to the execution of programs.

The industrial robot 70 may be a typical robot. For example, a multi-articulated robot having a plurality of arms is used for the driver 50. A number of joints, i.e. a number of axes, may be four or more. The movable frame 40 with four or more axes moves smoothly.

Note that the driver 50 is not limited to a multi-articulated robot, and may be a parallel link robot or the like. Moreover, the driver 50 may also include a motion conversion mechanism that converts a rotational motion into a linear motion. For example, a ball screw may be used for the motion conversion mechanism.

Figure 3:
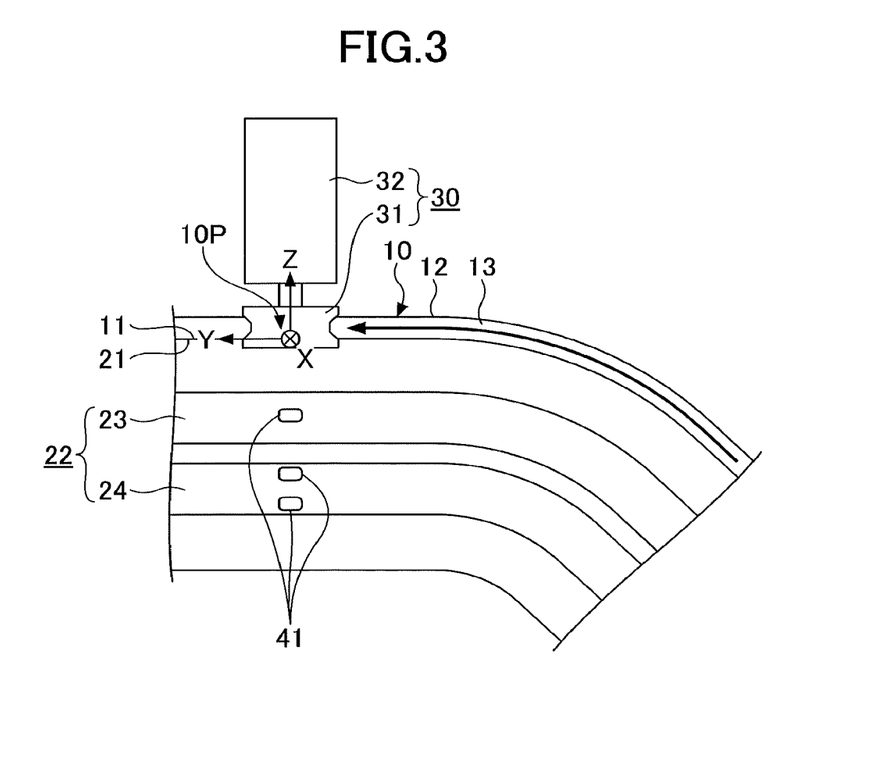
FIG. 3 is a diagram depicting an example of a part of a trajectory of a machining device according to the embodiment, and illustrating a positional relationship between three contact points of a movable frame with a guide and a machining point of a curved plate.
Figure 4:
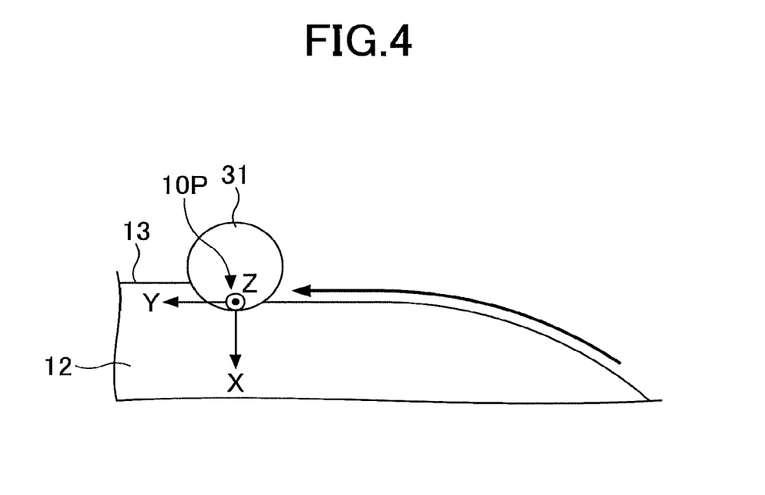
FIG. 4 is a diagram depicting another example of a part of the trajectory of the machining device according to the embodiment.

FIG. 2 is a diagram illustrating a main part of the machining apparatus according to the embodiment. In FIG. 2, the solid line indicates an elastic deformation state of an elastic deformer, and the double-dotted line indicates a free state of the elastic deformer. In the free state, no force is applied to the elastic deformer 80 from the driver 50. The same applies to FIGS. 8 to 10, which will be described later. FIG. 3 is a diagram depicting an example of a part of a trajectory of the machining device according to the embodiment, and illustrating a positional relationship between three contact points of the movable frame with the guide and the machining point of the curved plate. FIG. 4 is a diagram depicting another example of the part of the trajectory of the machining device according to the embodiment. In FIGS. 3 and 4, arrows indicate the trajectory of the machining point 10P.

The holder 20 has a guide 22 that increases a precision of machining of the curved plate 10 as illustrated in FIG. 2. The guide 22 may be manufactured separately from a holding base holding the curved plate 10, and mounted on the holding base. Alternatively, the guide 22 may be manufactured integrally with the holding base. The guide 22 guides the movable frame 40 along the outer circumference of the curved plate 10 held by the holder 20.

In the embodiment, the holder 20 is configured of the guide 22 and the holding base, but the holder 20 may be configured only of the holding base. In this case, the holding base may be brought into contact with the guide 22, or separated from the guide 22. When the holding base is separated from the guide 22, the holding base and the guide 22 may be fixed separately. With respect to the method of fixing the holding base and the guide 22, the case where the holding base is separated from the guide 22 involves more degrees of freedom than the case where the holding base contacts the guide 22.

The guide 22 extends along the moving direction (Y-direction) of the movable frame 40. The movable frame 40 moves in the Y-direction along the guide 22, while being pressed in the X- or Z-direction against the guide 22. Thus, the guide 22 restricts a motion of the movable frame 40 in the X- and Z-directions, by pressing the movable frame 40 against the guide 22.

The guide 22 restricts a rotational motion of the movable frame 40, viewed from the Y-direction, by pressing against the guide 22. Thus, a stable orientation of the machining device 30 on the holder 20 is obtained, and the machining of the curved plate 10 is stable.

The guide 22 allows for a rotational motion of the movable frame 40 viewed from the X-direction (See FIG. 3) and allows for a rotational motion of the movable frame 40 viewed from the Z-direction (See FIG. 4). Thus, the curved plate 10 can be machined in a complex shape. A configuration of the movable frame 40 that is brought into contact with the guide 22 determines whether rotational motion viewed from the X-direction or rotational motion viewed from the Y-direction is allowed.

The guide 22 has two guide surfaces 23 and 24 that are brought into contact with the movable frame 40, in a cross section perpendicular to the Y-direction, as illustrated in FIG. 2. In the specification of the present application, the cross section perpendicular to the Y-direction passing through the machining point 10P will be illustrated. The number of the guide surfaces is not limited to two. The number may be three or more.

When the movable frame 40 is pressed against the guide 22, a Z-direction component of a reaction force F1 acting on the movable frame 40 from one guide surface 23 and a Z-direction component of a reaction force F2 acting on the movable frame 40 from the other guide surface 24 preferably have the same magnitude, and a direction of the Z-direction component of F1 is preferably opposite to the Z-direction component of F2. Thus, a motion in the Z-direction of the movable frame 40 pressed against the guide 22 is restricted. Furthermore, an abrasion of the guide surfaces 23 and 24 is reduced.

The guide 22, in a cross-section perpendicular to the Y-direction, has a V-shape, for example. The guide surfaces 23 and 24 are inclined to the Z-direction. The shapes of the guide surfaces 23 and 24 are not particularly limited. For example, one of the two guide surfaces 23 and 24 may be perpendicular to the Z-direction. Moreover, in the embodiment, the guide surfaces 23 and 24 are formed with straight lines in the cross-section perpendicular to the Y-direction, but the guide surfaces 23 and 24 may be formed with curves.

Note that the Z-direction component of the reaction force F1 and the Z-direction component of the reaction force F2 may not have the same magnitude or may not be opposite to each other. In this case, one of the two guide surfaces 23 and 24 may be perpendicular to the Z-direction and the other surface may be parallel to the Z-direction.

The movable frame 40 may include a rolling element 41, which rolls in contact with the guide 22, that reduces a friction with the guide 22; and a movable main body 42, which retains the rolling element 41, so that the rolling element can rotate freely, and retains the machining device 30. A roller, for example, is used for the rolling element 41. Note that a ball also may be used for the rolling element 41.

The number of rolling elements 41 is preferably three. When the movable frame 40 is brought into contact with the guide 22 at three points, a stable orientation of the movable frame 40 is obtained. As shown in FIG. 3, the three contact points, at which the movable frame 40 is brought into contact with the guide 22, and the machining point 10P of the curved plate 10 may be arranged on the same straight line, viewed from the X-direction.

Note that the number and the arrangement of the rolling elements 41 are not particularly limited. The number of the rolling elements 41 may be one, two, or four or more. The plurality of rolling elements 41 may be coupled and integrally rotate. The rolling elements 41 are provided in the movable frame 40 in FIGS. 1 and 2, but may be provided in the guide 22.

The machining apparatus may further include, as shown in FIG. 2, an elastic deformer 80 between the movable frame 40 and the driver 50, which is elastically deformed by the driver 50 and presses the movable frame 40 against the guide 22 according to a restoration force from the elastic deformation. A precision required of controlling the position of the movable frame 40 can be eased, because the movable frame 40 can be continuously pressed against the guide 22 until the elastic deformer 80 is changed from the elastic deformation state (the state shown in the solid line in FIG. 2) to the free state (the state shown in the double dotted line in FIG. 2). Thus, a teaching work for the industrial robot 70 can be simplified. The industrial robot 70 performs a work by reproducing an operation recorded in the teaching work. The teaching work may be performed by using any of a method of operating the industrial robot 70 with a remote control to cause the robot 70 to store its orientation, or a method of causing the robot 70 to store a procedure of motion prepared from CAD data, or the like.

The elastic deformer 80 may include, for example, an X-direction elastic deformer 81 that elastically deforms in the X-direction, and a Z-direction elastic deformer 82 that elastically deforms in the Z-direction. A degree of deformation in the X-direction and a degree of deformation in the Z-direction can be set independently. The X-direction elastic deformer 81 is elastically deformed by a translation of the movable frame 40 with respect to the driver 50 in the X-direction. Thus, the required precision in the teaching work for the industrial robot 70 in the X-direction can be eased. In contrast, the Z-direction elastic deformer 82 is elastically deformed by a translation in the Z-direction of the movable frame 40 with respect to the driver 50. Thus, the required precision in the teaching work for the industrial robot 70 in the Z-direction can be eased.

The X-direction elastic deformer 81 includes, for example, a laminated rubber 83. The laminated rubber 83 includes rubber layers 83a and steel plates 83b which are laminated alternately in the Z-direction. When the laminated rubber 83 is compressed in the Z-direction, the steel plates 83b restrict swelling of the rubber layers 83a, and the laminated rubber 83 is not deformed in the Z-direction. When the laminated rubber 83 is pressed in the X-direction, a shear deformation occurs in the laminated rubber 83. The shear deformation also occurs when the laminated rubber 83 is pressed in the Y-direction, and a deformation restrictor 90 (see FIG. 5) may be provided to restrict the Y-direction deformation of the laminated rubber 83. In addition, a spring, such as a coil spring, an air spring, or a leaf spring, may be used instead of the laminated rubber 83.

The Z-direction elastic deformer 82 includes, for example, a laminated rubber 84. The laminated rubber 84 includes rubber layers 84a and steel plates 84b which are laminated alternately in the X-direction. When the laminated rubber 84 is compressed in the X-direction, the steel plates 84b restrict swelling of the rubber layers 84a, and the laminated rubber 84 is not deformed in the X-direction. When the laminated rubber 84 is pressed in the Z-direction, a shear deformation occurs in the laminated rubber 84. The shear deformation also occurs when the laminated rubber 84 is pressed in the Y-direction, and a deformation restrictor 90 (see FIG. 5) may be provided to restrict the Y-direction deformation of the laminated rubber 84. In addition, springs such as coil springs or leaf springs may be used instead of the laminated rubber 84.

The elastic deformer 80 of the embodiment includes the X-direction elastic deformer 81 that is elastically deformed in the X-direction and the Z-direction elastic deformer 82 that is elastically deformed in the Z-direction. However, the elastic deformer 80 may include a bidirectional elastic deformer that is elastically deformed in the X-direction and the Z-direction. The bidirectional elastic deformer may include a laminated rubber including rubber layers and steel plates laminated alternately in the Y-direction. The laminated rubber is not deformed when the laminated rubber is compressed in the Y-direction, and a shear deformation occurs when the laminated rubber is pressed in the X-direction or the Z-direction.

Figure 5:
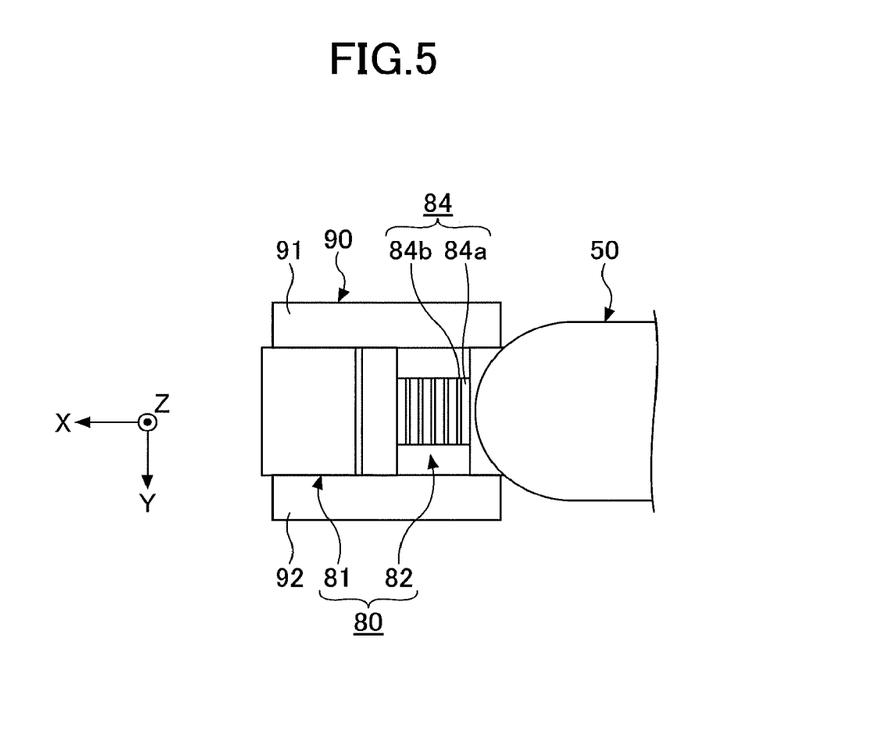
FIG. 5 is a diagram depicting an example of a deformation restrictor that restricts a deformation of an elastic deformer, illustrated in FIG. 2, in a Y-direction.

The machining apparatus may further include a deformation restrictor 90 which restricts a predetermined deformation of the elastic deformer 80, as shown in FIG. 5. The deformation restrictor 90 includes, for example, steel plates 91 and 92 that hold the elastic deformer 80 from both sides in the Y-direction. In the embodiment, the steel plates 91 and 92 are fixed to a tip portion of the driver 50. However, the steel plates 91 and 92 may be fixed to the movable frame 40.

The deformation restrictor 90 restricts (1) a deformation of the elastic deformer 80 in the Y-direction. Thus, a position shift in the Y-direction between the tip portion of the driver 50 and the movable frame 40 can be prevented from occurring, and the precision of machining is increased.

The deformation restrictor 90 restricts (2) torsion of the elastic deformer 80 viewed from the X-direction. The "torsion of the elastic deformer 80 viewed from the X-direction" means a rotational motion of one end of the elastic deformer 80 in the X-direction with respect to the other end. Thus, torsion between the tip portion of the driver 50 and the movable frame 40, viewed from the X-direction, can be prevented from occurring, and the precision of machining is increased.

The deformation restrictor 90 also restricts (3) torsion of the elastic deformer 80 viewed from the Z-direction. The "torsion of the elastic deformer 80 viewed from the Z-direction" means a rotational motion of one end of the elastic deformer 80 in the Z-direction with respect to the other end. Thus, torsion between the tip portion of the driver 50 and the movable frame 40, viewed from the Z-direction, can be prevented from occurring, and the precision of machining is increased.

Note that the deformation restrictor 90 of the embodiment restricts (1) the deformation of the elastic deformer 80 in the Y-direction, (2) the torsion of the elastic deformer 80 viewed from the X-direction, and (3) the torsion of the elastic deformer 80 viewed from the Z-direction. However, the deformation restrictor 90 may restrict any one of the deformations, or any two of the deformations.

(Method of Manufacturing Curved Plate with Machined Outer Circumference)

Figure 6:
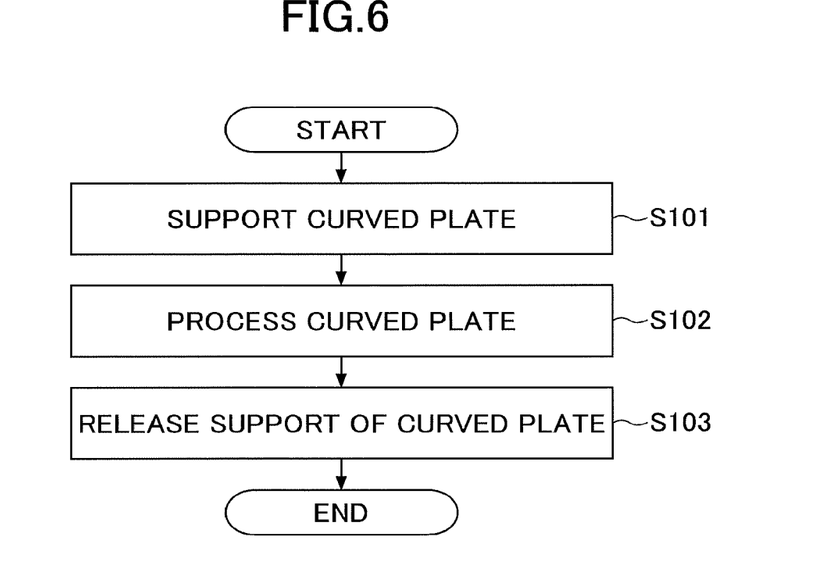
FIG. 6 is a flowchart depicting an example of a manufacturing method of a curved plate with a machined outer circumference according to the embodiment.

Next, with reference to FIG. 6 or the like, a method of manufacturing a curved plate with an outer circumference that is machined using the machining apparatus with the above-described configuration will be described. Operations of the machining apparatus, described below, are controlled by the controller 60. FIG. 6 is a flowchart illustrating the method of manufacturing a curved plate with a machined outer circumference according to the embodiment.

Processing in step S101 and subsequent steps shown in FIG. 6 start when the holder 20 receives the curved plate 10 from a conveyance device. The curved plate 10 is positioned by using a positioning device, and placed on the holder 20 by the conveyance device. Note that in the embodiment, the curved plate 10 is automatically placed on the holder 20 by the conveying device or the like. However, the curved plate 10 may be placed on the holder 20 manually.

In step S101, the controller 60 starts holding the curved plate 10 by the holder 20. For example, the controller 60 actuates a vacuum pump to apply suction to the curved plate 10 on the holder 20.

In step S102, the controller 60 causes the machining device 30 to machine the outer circumference of the curved plate 10 held by the holder 20. In this process, the movable frame 40 retaining the machining device 30 is moved being guided by the guide 22 provided by the holder 20 along the outer circumference of the curved plate 10 held by the holder 20. The holder 20 may be configured only of a holding base. In this case, the holding base may be brought into contact with the guide 22, or may be separated from the guide 22. When the holding base and the guide 22 are separated from each other, the holding base and the guide 22 may be fixed independently.

In step S103, the controller 60 releases the holding of the curved plate 10 by the holder 20. For example, the controller 60 stops the operation of the vacuum pump and releases the suction of the curved plate 10 by the holder 20. Then, the controller 60 completes the process, and the conveyance device separates the curved plate 10 from the holder 20.

Effect

As described above, the machining apparatus includes a guide 22 that guides the movable frame 40 along the outer circumference of the curved plate 10 held by the holder 20. Accordingly, the stable trajectory of the machining device 30 retained by the movable frame 40 is obtained, and the precision of machining of the curved plate 10 is increased.

Moreover, the holder 20 includes a guide 22 that guides the movable frame 40 along the outer circumference of the curved plate 10 held by the holder 20. Thus, the stable trajectory of the machining device 30 retained by the movable frame 40 is obtained, and the precision of machining of the curved plate 10 is increased.

The guide 22 restricts a rotational motion of the movable frame 40 pressed against the guide 22 viewed from the Y-direction. Thus, the stable orientation of the machining device 30 on the holder 20 is obtained, and the machining of the curved plate 10 is stable.

The guide 22 restricts rotational motion of the movable frame 40 pressed against the guide 22 viewed from the Y-direction, and allows for rotational motion viewed from the X-direction and for rotational motion viewed from the Z-direction. Thus, the curved plate 10 can be machined in a complex shape.

The elastic deformer 80 is arranged between the movable frame 40 and the driver 50, and is elastically deformed by the driver 50, and presses the movable frame 40 against the guide 22 according to a restoration force from the elastic deformation. Until the elastic deformer 80 is changed from the elastic deformation state (indicated by a solid line in FIG. 2) to the free state (indicated by a double dotted line in FIG. 2), because the movable frame 40 can continuously press the movable frame 40 against the guide 22, the precision required for position control of the movable frame 40 can be eased. Thus, the teaching work for the industrial robot 70 can be simplified.

The deformation restrictor 90 restricts an unintended deformation of the elastic deformer 80. According to the deformation restrictor 90, an unintended shift of position between the tip portion of the driver 50 and the movable frame 40 can be prevented, and the precision of machining is increased.

Variation and Improvement

As described above, embodiments of the machining apparatus and the machining method have been described. However, the present invention is not limited to the above-described embodiments. Various modifications and improvements can be made within the scope of the gist of the present invention as claimed in claims.

For example, the machining apparatus of the above-described embodiment has a set of the machining device 30, the movable frame 40, the driver 50, and the controller 60. However, the machining apparatus may have a plurality of sets. When the machining apparatus has the plurality of sets, a range other than the movable range of one movable frame 40 can be machined by the other movable frame 40. A movable range of the movable frame 40 is restricted depending on, for example, the type of the industrial robot 70.

Figure 7:
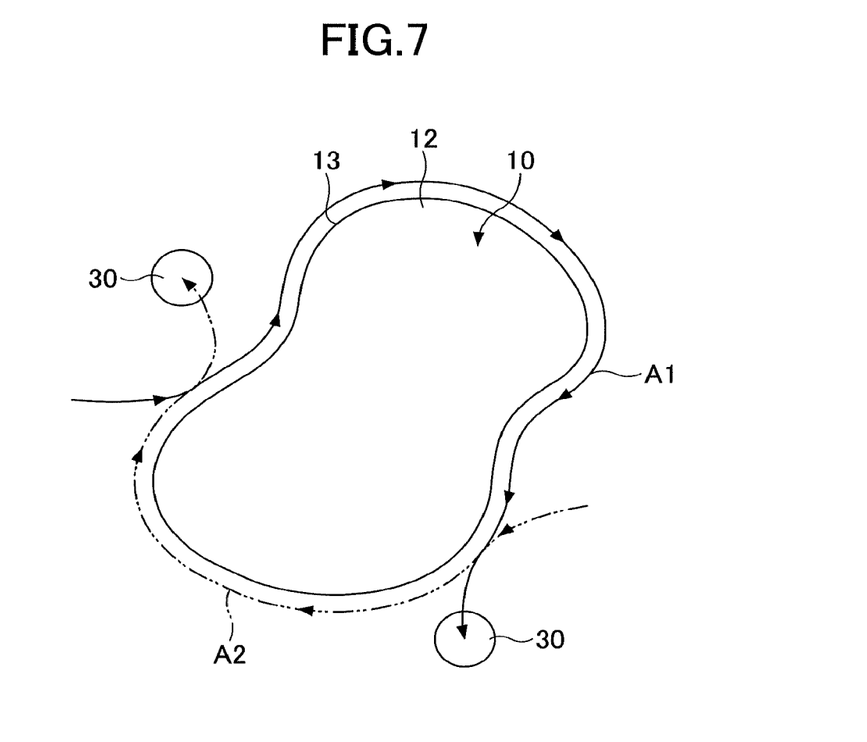
FIG. 7 is a diagram depicting an example of trajectories of a plurality of machining devices according to first to fifth variations.

FIG. 7 is a diagram depicting trajectories of a plurality of machining devices according to first to fifth variations. In FIG. 7, a solid arrow A1 shows a trajectory of one machining device 30, and a double-dotted arrow A2 shows a trajectory of another machining device 30.

As illustrated in FIG. 7, one machining device 30 machines a part of an outer circumference of a curved plate 10 held by a holder 20, and the other machining device 30 machines the other part of the outer circumference of the curved plate 10 held by the holder 20. One machining device 30 and the other machining device 30 may machine the curved plate 10 simultaneously, or may machine the curved plate 10 sequentially.

As illustrated in FIG. 7, the plurality of machining devices 30 may machine the outer circumference of the curved plate 10 held by the holder 20 over the entire periphery. In this case, the trajectory of one machining device 30 partially overlaps with the trajectory of the other machining device 30. That is, in this case, a machining range of one machining device 30 partially overlaps with a machining range of the other machining device 30.

The holder 20 according to the embodiment is fixed. However, the holder 20 may be rotated. The controller 60 may cause the holder 20 to rotate by using an electric motor or the like, and cause the driver to move the movable frame 40, to machine the curved plate 10 held by the holder 20 by the machining device 30. The rotation of the holder 20 expands the machining area of the machining device 30. When the holder 20 is configured only of a holding base, the guide 22 is fixed to the holding base, and the guide 22 is rotated with the holding base.

The machining device 30 according to the embodiment grinds the outer periphery 13 of the curved plate 10 held by the holder 20. However, the machining device 30 is not particularly limited, as long as the outer circumference of the curved plate 10 held by the holder 20 is machined.

Figure 8:
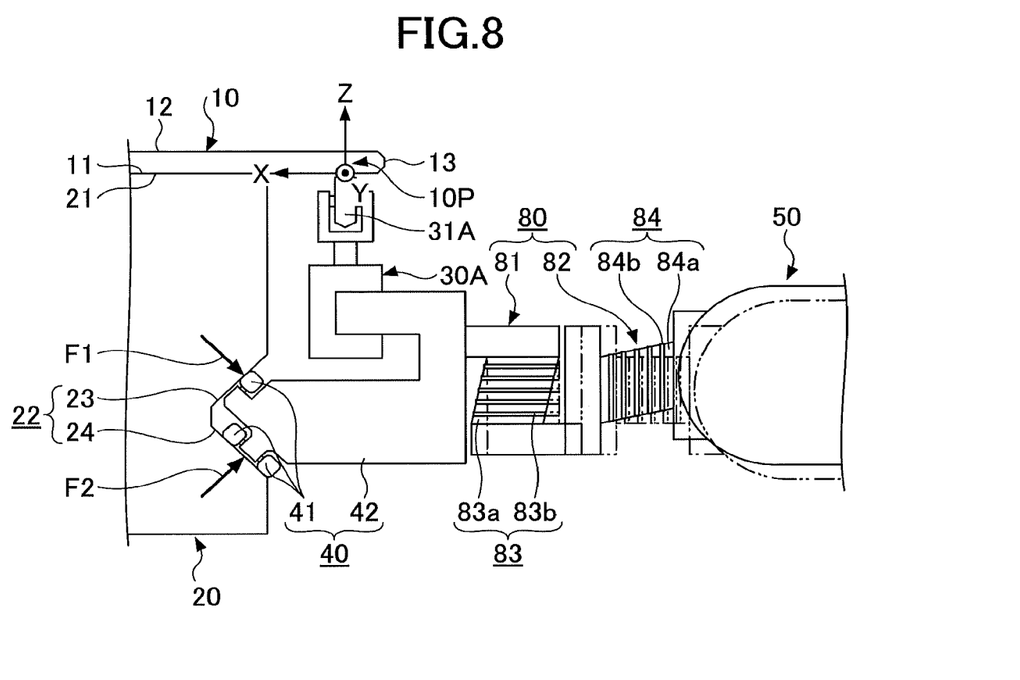
FIG. 8 is a diagram depicting an example of the main part of the machining apparatus, illustrated in FIG. 2, according to the first variation.

FIG. 8 is a diagram illustrating the main part of the machining apparatus illustrated in FIG. 2 according to a first variation. The machining apparatus according to the first variation includes a machining device 30A, which is used to cut the curved plate 10 held by the holder 20, instead of the machining device 30 that grinds the outer periphery 13 of the curved plate 10 held by the holder 20.

The machining device 30A includes a cutting device 31A, which is pressed against a main surface 11 of the curved plate 10 held by the holder 20. When the driver 50 causes the movable frame 40 to move along the guide 22, the cutting device 31A forms a groove (scribe line) on the main surface 11 of the curved plate 10. After forming the scribe line, the curved plate 10 is divided into pieces, cut along the scribe line. The cutting device 31A may be pressed against either of the main surfaces 11 and 12 of the curved plate 10.

Figure 9:
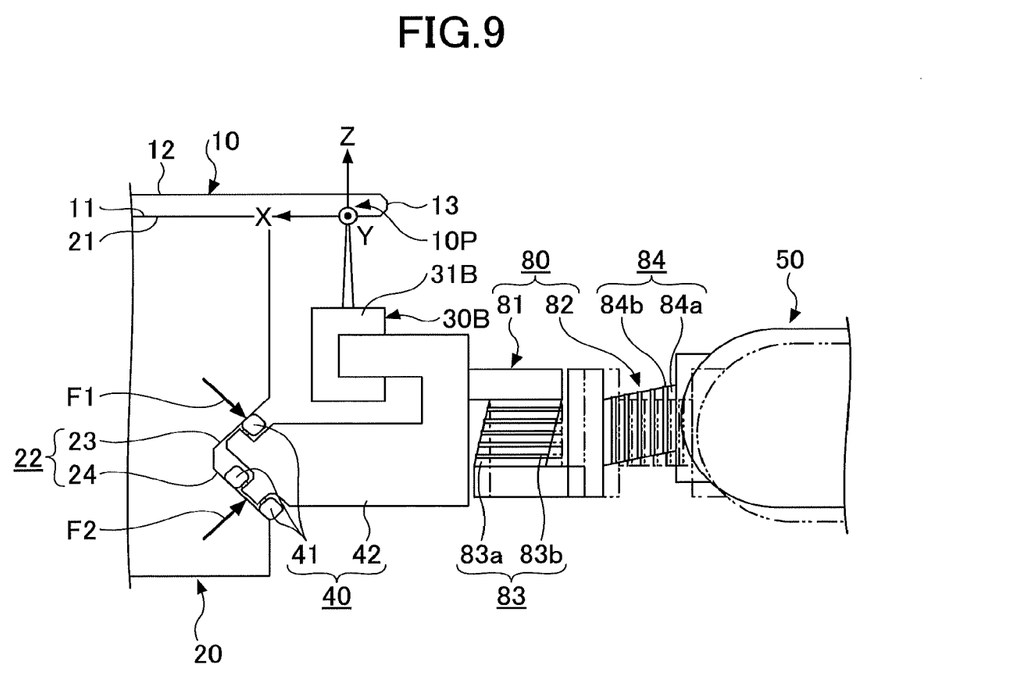
FIG. 9 is a diagram depicting an example of the main part of the machining apparatus, illustrated in FIG. 2, according to the second variation.

FIG. 9 is a diagram illustrating the main part of the machining apparatus illustrated in FIG. 2 according to a second variation. The machining apparatus according to the second variation includes a machining device 30B, which is used to cut the curved plate 10 held by the holder 20, instead of the machining device 30 that grinds the outer periphery 13 of the curved plate 10 held by the holder 20.

The machining device 30B includes a light source 31B that irradiates the main surface 11 of the curved plate 10 held by the holder 20 with laser light. The laser light locally heats the curved plate 10, to generate a thermal stress in the curved plate 10. When the driver 50 causes the movable frame 40 to move along the guide 22, an irradiation position of the laser light on the main surface 11 moves, and a scribe line is formed along the trajectory of the irradiation position. The scribe line is formed by the thermal stress. After the scribe line is formed, the curved plate 10 is divided into pieces cut along the scribe line. Note that any of the main surfaces 11 and 12 of the curved plate 10 may be irradiated by the light source 31B with laser light.

The machining device 30B is used to form a scribe line on the curved plate 10 in the embodiment. However, the machining device 30B may be used to divide the curved plate 10 along a formed scribe line, or may be used to divide the curved plate 10 on which a scribe line has not been formed.

In the embodiment, the machining device 30B heats the curved plate 10 at a temperature below the melting point, to generate a thermal stress in the curved plate 10. However, the machining device 30B may heat the curved plate 10 to a temperature above the melting point and blow off a melted portion of the curved plate 10 with a gas, to cut the curved plate 10.

Alternatively, the machining apparatus may have a machining device used for a surface treatment for the outer circumference of the curved plate 10 held by the holder 20, instead of the machining device 30 that grinds the outer periphery 13 of the curved plate 10 held by the holder 20. In the specification of the present application, the machining includes the surface treatment.

The machining device includes a nozzle, and a dispensing device that performs the surface treatment on the main surface 11 or the outer periphery 13 of the curved plate 10 held by the holder 20. A coating liquid, such as a low viscosity liquid or a gas, is discharged from the nozzle. Thus, for example, a black ceramic layer in the peripheral portion of the main surface can be formed, or the surface can be coated in order to increase designability. From the dispensing device, a relatively high viscosity solution or paste for ion exchange, or a resin is discharged. When the solution or paste for ion exchange is applied to the outer periphery 13, a fracture strength of the outer periphery 13 of the curved plate 10 is increased by heating the solution after the application. When the resin or the like is applied to the outer periphery 13, a protection layer is formed on the outer periphery 13.

Figure 10:
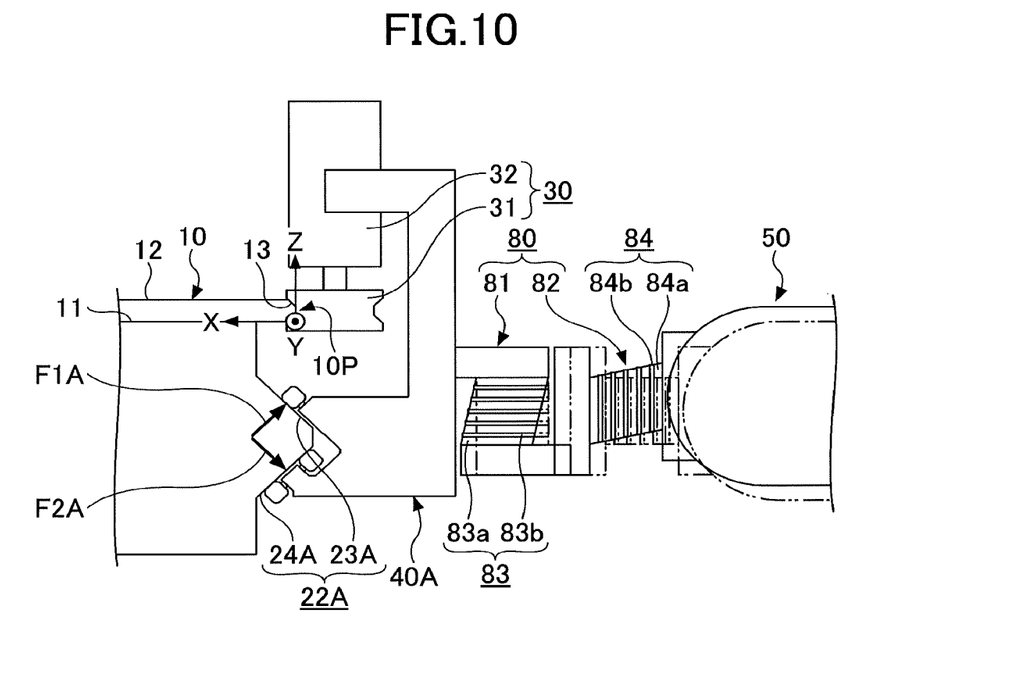
FIG. 10 is a diagram depicting an example of the main part of the machining apparatus, illustrated in FIG. 2, according to the third variation.

FIG. 10 is a diagram illustrating the main part of the machining apparatus illustrated in FIG. 2 according to a third variation. The guide 22 shown in FIG. 2 has a shape of a recessed groove. However, in the third variation, a guide 22A shown in FIG. 10 has a shape of a projecting rail. When a movable frame 40A is pressed against the guide 22A, a Z-direction component of a reaction force F1A acting on the movable frame 40A from one guide surface 23A and a Z-direction component of a reaction force F2A acting on the movable frame 40A from the other guide surface 24A, have the same magnitude, and are opposite to each other. Thus, a motion in the Z-direction of the movable frame 40A pressed against the guide 22A is restricted.

Figure 11:
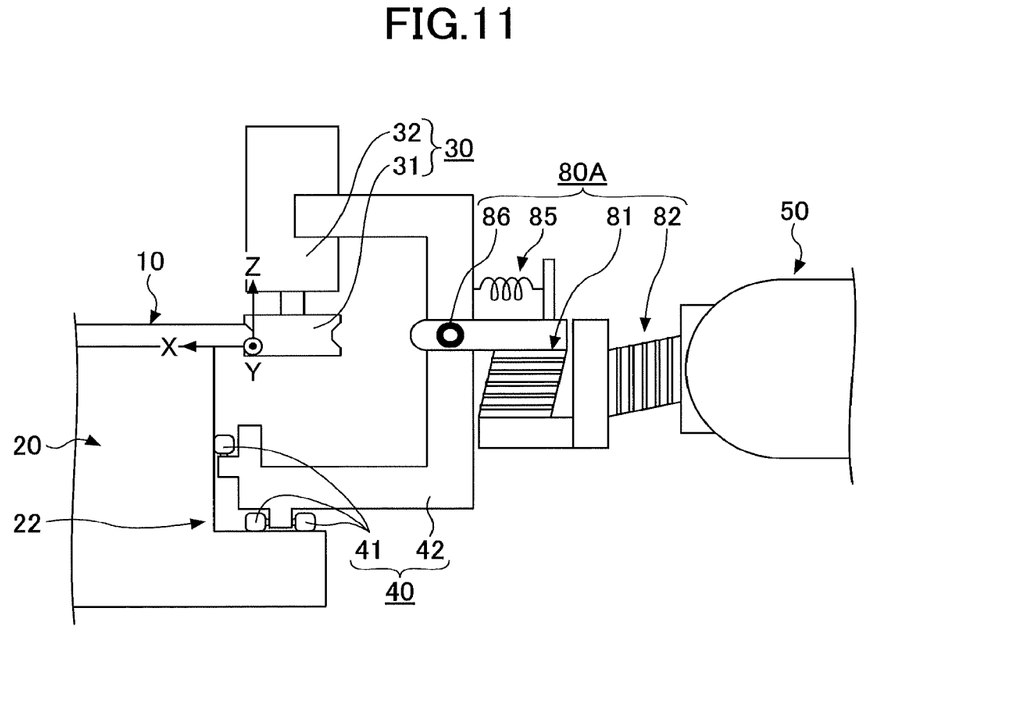
FIG. 11 is a diagram depicting an example of the main part of the machining apparatus, illustrated in FIG. 2, according to the fourth variation.

FIG. 11 is a diagram illustrating the main part of the machining apparatus illustrated in FIG. 2 according to a fourth variation. An elastic deformer 80A according to the fourth variation includes a θ-direction elastic deformer 85 in addition to the X-direction elastic deformer 81 and the Z-direction elastic deformer 82. The difference between the fourth variation and the embodiment will be described below. Each of the X-direction elastic deformer 81, the Z-direction elastic deformer 82, and the θ-direction elastic deformer 85 may be used alone. Alternatively, any combination thereof may be used. A number of deformers in the combination may be two or may be three. The θ-direction is a rotational direction around a rotational axis 86 that is parallel to the Y-direction.

The rotational axis 86 is retained, for example, in the movable frame 40. A translation of the rotational axis 86 is restricted in the X-direction, in the Y-direction, and the Z-direction with respect to the movable frame 40. The θ-direction elastic deformer 85 is configured of, for example, a coil spring, and is elastically deformed by a rotational motion of the movable frame 40 with respect to the driver 50 around the rotational axis 86. Thus, the required precision in the teaching work of the industrial robot 70 in the θ direction is eased.

Figure 12A:
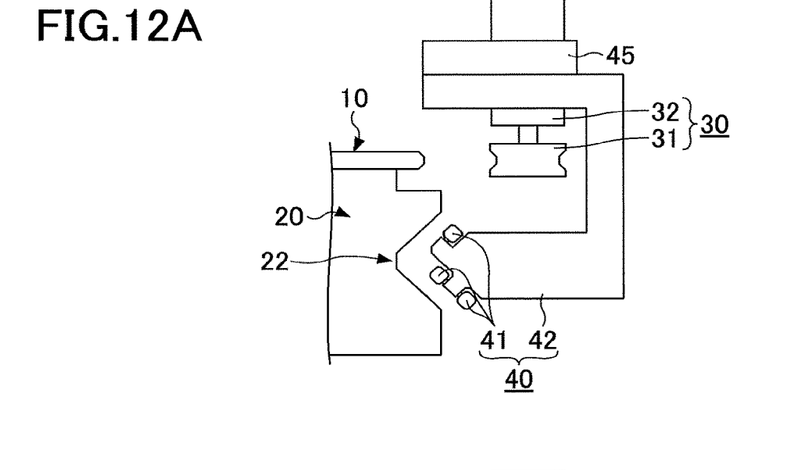
FIGS. 12A to 12C are diagrams depicting an example of the main part of the machining apparatus, illustrated in FIG. 2, according to the fifth variation.
Figure 12B:
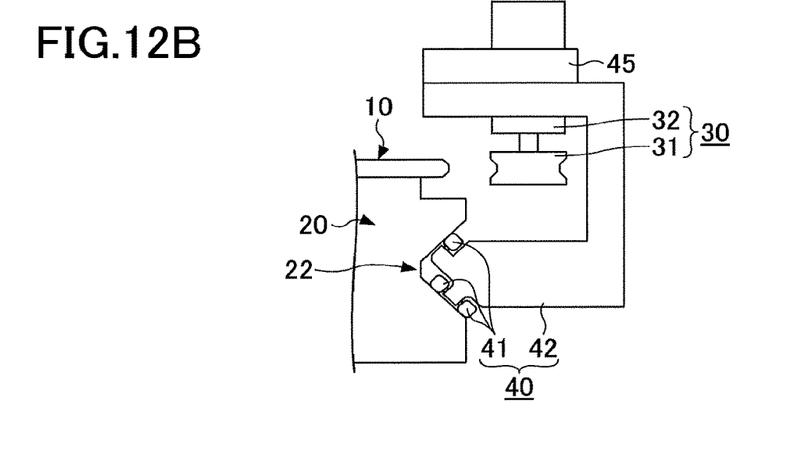
Figure 12C:
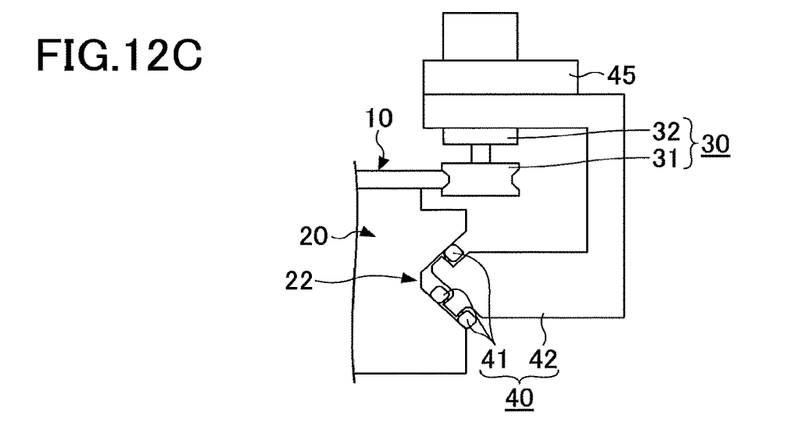

FIGS. 12A to 12C are diagrams illustrating the main part of the machining apparatus illustrated in FIG. 2 according to a fifth variation. FIG. 12A shows a state before the movable frame comes into contact with the guide. FIG. 12B shows a state when the movable frame is contacted with the guide. FIG. 12C shows a state when the machining device is moved in the X-direction with respect to the movable frame, and the machining device is contacted with the outer circumference of the curved plate held by the holder. The machining apparatus according to the fifth variation includes an X-direction position changer 45 which moves an X-direction position of the machining device 30 with respect to the movable frame 40. The difference between the fifth variation and the embodiment will be described below. Note that in the fifth variation, a Y-direction position and a Z-direction position of the machining device 30 with respect to the movable frame 40 are fixed.

The X-direction position changer 45 is configured of, for example, a motor, or a ball screw that converts a rotational motion of the motor into a linear motion, and moves the X-direction position of the machining device 30 with respect to the movable frame 40. As a position detector that detects the X-direction position of the machining device 30 with respect to the movable frame 40, for example, an encoder that detects a rotational position of a motor is used. The encoder outputs a signal indicating a direction of rotation and an amount of rotation of the motor to the controller 60. The controller 60 controls the X-direction position of the machining device 30 with respect to the movable frame 40 based on the signal output from the position detector.

Before starting machining, as shown in FIG. 12A, the movable frame 40 is separated from the guide 22, and the machining device 30 is separated from the outer circumference of the curved plate 10 held by the holder 20. Then, as shown in FIG. 12B, the movable frame 40 is brought into contact with the guide 22. Thus, a stable orientation of the movable frame 40 with respect to the holder 20 is obtained. At this time, the machining device 30 is separated from the outer circumference of the curved plate 10 held by the holder 20, and the outer circumference of the curved plate 10 is not machined by the machining device 30. Then, as shown in FIG. 12C, the machining device 30 is moved in the X-direction with respect to the movable frame 40, and the machining device 30 is brought into contact with the outer circumference of the curved plate 10 held by the holder 20. Then, the machining of the outer circumference of the curved plate 10 starts.

As described above, according to the fifth variation, the movable frame 40 is brought into contact with the guide 22. Then, the machining device 30 is moved in the X-direction with respect to the movable frame 40, and thereby the machining device 30 is brought into contact with the outer circumference of the curved plate 10 held by the holder 20. Then, the machining of the outer circumference of the curved plate 10 starts. Thus, with the stable orientation of the movable frame 40 with respect to the holder 20, machining of the outer circumference of the curved plate 10 held by the holder 20 starts. Accordingly, control against an unintended machining due to an improper orientation of the movable frame 40 can be applied.

Note that in the fifth variation the X-direction position changer 45 is used that controls against an unintended machining when the machining starts. However, the X-direction position changer 45 may be used for other purposes. For example, after long term machining the grinding device 31 becomes worn, and a grinding amount for the curved plate 10 is reduced. Then, using an inspection apparatus such as a camera a difference between the target machining trajectory of the curved plate 10 and the actual machining trajectory of the curved plate 10 is detected, and the X-direction position of the machining device 30 is moved with respect to the movable frame 40. The machining trajectory is a contour of the curved plate 10 after the machining.

The X-direction position of the machining device 30 with respect to the movable frame 40 may be moved during the machining of the curved plate 10. In more detail, the X-direction position of the machining device 30 with respect to the movable frame 40 may be moved based on a difference between a target machining trajectory of an n-th curved plate 10 and an actual machining trajectory of the n-th curved plate 10 during the machining of the n-th (n is a natural number greater than or equal to one) curved plate 10. The X-direction position of the machining device 30 with respect to the movable frame 40 is moved in the machining of the n-th curved plate 10 so that the difference between the target machining trajectory and the actual machining trajectory becomes zero.

Moreover, when machining an m-th (m is a natural number greater than n) curved plate 10, the X-direction position of the machining device 30 with respect to the movable frame 40 may be moved from the case where the n-th curved plate 10 is machined based on the difference between the target machining trajectory of the n-th curved plate 10 and the actual machining trajectory of the n-th curved plate 10. The X-direction position of the machining device 30 with respect to the movable frame 40 is moved in the machining of the m-th curved plate 10 so that the difference between the target machining trajectory and the actual machining trajectory becomes zero.

REFERENCE SIGNS LIST 10 curved plate
11,12 main surface
13 outer periphery
20 holder
21 holding surface
22 guide
23,24 guide surface
22A guide
23A,24A guide surface
30 machining device
31 grinding device (rotating grinding wheels)
30A machining device
31A cutting device
30B machining device
31B light source
40 movable frame
40A movable frame
45 X-direction position changer
50 driver
60 controller
70 industrial robot
80 elastic deformer
81 X-direction elastic deformer
82 Z-direction elastic deformer
85 θ orientation elastic deformer
86 rotational axis
90 deformation restrictor

What is claimed is:

1. A machining apparatus for a curved plate, comprising:
    a holder that holds a main surface of a curved plate having curved surfaces;
    a machining device that machines an outer circumference of the curved plate held by the holder;
    a movable frame retaining the machining device with respect to the outer circumference of the curved plate held by the holder;
    a driver that moves the movable frame such that the machining device retained by the movable frame moves a machining point of the curved plate held by the holder;
    a controller comprising circuitry configured to control the driver such that the driver moves the movable frame along the outer circumference of the curved plate held by the holder; and
    a guide that guides the movable frame along the outer circumference of the curved plate held by the holder such that the guide restricts a rotational motion of the movable frame pressed against the guide with respect to a moving direction of the movable frame.

2. The machining apparatus for a curved plate according to claim 1, wherein the guide restricts the rotational motion of the movable frame pressed against the guide with respect to a Y-direction and allows a rotational motion of the movable frame with respect to an X-direction and a rotational motion of the movable frame with respect to a Z-direction, where the Y-direction is the moving direction of the movable frame, the Z-direction is a plate thickness direction of the curved plate held by the holder at the machining point, and the X-direction is a direction orthogonal to the Y-direction and to the Z-direction.

3. The machining apparatus for a curved plate according to claim 1, wherein the guide includes a plurality of guide surfaces configured to be brought into contact with the movable frame in a cross section perpendicular to a Y-direction, where the Y-direction is the moving direction of the movable frame, a Z-direction is a plate thickness direction of the curved plate held by the holder at the machining point, and an X-direction is a direction orthogonal to the Y-direction and to the Z-direction.

4. The machining apparatus for a curved plate according to claim 1, further comprising:
    an elastic deformer positioned between the movable frame and the driver such that the elastic deformer is elastically deformed by the driver and presses the movable frame against the guide by a restoration force from an elastic deformation of the elastic deformer.

5. The machining apparatus for a curved plate according to claim 4, further comprising:
    a deformation restrictor that restricts a deformation of the elastic deformer in the moving direction of the movable frame.

6. The machining apparatus for a curved plate according to claim 4, further comprising:
    a deformation restrictor that restricts a torsion of the elastic deformer with respect to an X-direction, where a Y-direction is the moving direction of the movable frame, a Z-direction is a plate thickness direction of the curved plate held by the holder at the machining point, and the X-direction is a direction orthogonal to the Y-direction and to the Z-direction.

7. The machining apparatus for a curved plate according to claim 4, further comprising:
a deformation restrictor that restricts a torsion of the elastic deformer with respect to a Z-direction the Z-direction is a plate thickness direction of the curved plate held by the holder at the machining point.

8. The machining apparatus for a curved plate according to claim 4, wherein the elastic deformer includes an X-direction elastic deformer that elastically deforms by a translation of the movable frame with respect to the driver in an X-direction, where a Y-direction is the moving direction of the movable frame, a Z-direction is a plate thickness direction of the curved plate held by the holder at the machining point, and the X-direction is a direction orthogonal to the Y-direction and to the Z-direction.

9. The machining apparatus for a curved plate according to claim 4, wherein the elastic deformer includes a Z-direction elastic deformer that elastically deforms by a translation of the movable frame with respect to the driver in the Z-direction, where a Y-direction is the moving direction of the movable frame, the Z-direction is a plate thickness direction of the curved plate held by the holder at the machining point, and an X-direction is a direction orthogonal to the Y-direction and to the Z-direction.

10. The machining apparatus for a curved plate according to claim 4, wherein the elastic deformer includes a θ direction elastic deformer that elastically deforms by the rotational motion of the movable frame with respect to the driver around a rotational axis parallel to a Y-direction, where the Y-direction is the moving direction of the movable frame, a Z-direction is a plate thickness direction of the curved plate held by the holder at the machining point, and an X-direction is a direction orthogonal to the Y-direction and to the Z-direction.

11. The machining apparatus for a curved plate according to claim 1, further comprising:
an X-direction position changer that moves an X-direction position of the machining device with respect to the movable frame, where a Y-direction is the moving direction of the movable frame, a Z-direction is a plate thickness direction of the curved plate held by the holder at the machining point, and the X-direction is a direction orthogonal to the Y-direction and to the Z-direction.

12. The machining apparatus for a curved plate according to claim 1, wherein the machining device includes a grinding device that grinds an outer periphery of the curved plate held by the holder.

13. The machining apparatus for a curved plate according to claim 12, wherein the grinding device is a rotating grinding wheel that grinds the outer periphery of the curved plate held by the holder.

14. The machining apparatus for a curved plate according to claim 1, wherein the machining device cuts the curved plate held by the holder.

15. The machining apparatus for a curved plate according to claim 14, wherein the machining device includes a cutting device that is pressed against the main surface of the curved plate held by the holder.

16. The machining apparatus for a curved plate according to claim 14, wherein the machining device includes a light source that irradiates the main surface of the curved plate held by the holder with laser light.

17. The machining apparatus for a curved plate according to claim 1, wherein the machining device, the movable frame, the driver, and the controller are provided in a plurality of sets such that one machining device machines a part of the outer circumference of the curved plate held by the holder, and another machining device machines another part of the outer circumference of the curved plate held by the holder.

18. The machining apparatus for a curved plate according to claim 17, wherein the plurality of machining devices machines the outer circumference of the curved plate held by the holder over an entire periphery.

19. The machining apparatus for a curved plate according to claim 1, wherein the driver and the controller are an industrial robot.

20. A method of manufacturing a curved plate with a machined outer circumference, comprising:
machining the outer circumference of the curved plate by the machining apparatus of claim 1.

21. A machining apparatus for a curved plate, comprising:
a holder that holds a main surface of a curved plate having curved surfaces;
a machining device that machines an outer circumference of the curved plate held by the holder;
a movable frame retaining the machining device with respect to the outer circumference of the curved plate held by the holder;
a driver that moves the movable frame such that the machining device retained by the movable frame moves a machining point of the curved plate held by the holder; and
a controller comprising circuitry configured to control the driver such that the driver moves the movable frame along the outer circumference of the curved plate held by the holder,
wherein the holder has a curved surface and a guide formed along a curvature of the curved surface of the holder such that the guide makes contact with the movable frame and guides the movable frame along the outer circumference of the curved plate held by the holder.

22. The machining apparatus for a curved plate according to claim 21, wherein the guide restricts a rotational motion of the movable frame pressed against the guide with respect to a moving direction of the movable frame.

23. A method of manufacturing a curved plate with a machined outer circumference, comprising:
holding a main surface of a curved plate having curved surfaces by a holder;
machining, by a machining device, an outer circumference of the curved plate held by the holder; and
guiding, when a movable frame retaining the machining device is moved in the machining, the movable frame along the outer circumference of the curved plate held by the holder, by using a guide,
wherein the machining includes moving the movable frame by an industrial robot.

24. The method of manufacturing a curved plate with a machined outer circumference according to claim 23, wherein the machining includes elastically deforming an elastic deformer brought into contact with the movable frame, and pressing the movable frame against the guide by a restoration force of the elastic deformer.

25. The method of manufacturing a curved plate with a machined outer circumference according to claim 23, wherein the machining includes moving an X-direction position of the machining device with respect to the movable frame, where a Y-direction is a moving direction of the movable frame, a Z-direction is a plate thickness direction of the curved plate held by the holder at the machining point, and the X-direction is a direction orthogonal to the Y-direction and to the Z-direction.

26. The method of manufacturing a curved plate with a machined outer circumference according to claim 25, wherein the guiding includes contacting the movable frame with the guide, and the machining includes moving the machining device in the X-direction with respect to the movable frame, and bringing the machining device into contact with the outer circumference of the curved plate held by the holder.

27. The method of manufacturing a curved plate with a machined outer circumference according to claim 25, wherein the machining includes moving the machining device such that the X-direction position of the machining device with respect to the movable frame is moved based on a difference between a target machining trajectory of the curved plate and an actual machining trajectory of the curved plate.

28. A method of manufacturing a curved plate with a machined outer circumference, comprising:
    holding a main surface of a curved plate having curved surfaces by a holder having a curved surface;
    machining an outer circumference of the curved plate, held by the holder, by a machining device; and
    guiding, when a movable frame retaining the machining device is moved in the machining, the movable frame along the outer circumference of the curved plate held by the holder, by using a guide formed in the holder along a curvature of the curved surface of the holder.

29. The method of manufacturing a curved plate with a machined outer circumference according to claim 28, wherein the moving includes moving the movable frame by an industrial robot.

\* \* \* \* \*